3,171,752
CONTACT LENS TREATING SOLUTION
Billy F. Rankin, Wheaton, Md., assignor to Burton Parsons Chemicals, Inc., Washington, D.C., a corporation of Delaware
No Drawing. Filed July 11, 1962, Ser. No. 209,212
15 Claims. (Cl. 106—194)

This application is a continuation-in-part of my application Serial No. 74,781, filed December 9, 1960, now abandoned.

This invention relates to a composition for treating contact lenses and more particularly to a composition having unique wetting and soaking properties for contact lenses.

Contact lenses in present usage and to which this invention is directed are generally of the non-scleral or corneal type which fit directly on the cornea of the eye and have one side in full contact with the eye fluids, the other side being in such contact during eye closure due to blinking, etc. They are usually made of transparent plastics, methyl methacrylate polymer being almost universally adopted as one of the most desirable materials for such lenses. The methyl methacrylate polymer lenses solved a number of problems of the contact lens industry, being comparatively easy to insert and unbreakable. However, even these new material lenses presented difficulties because of the inherent nature of methyl methacrylate polymers and the methods utilized in the manufacture of lenses therefrom. The manufacture of contact lenses of methyl methacrylate is generally accomplished by a first rough grinding with steel and a final grinding with diamond abrasives. This dual grinding appears to result in a product which is extremely hydrophobic, said hydrophobicity being caused not only by the general properties of the plastic, but also by the grinding which results in either a magnetic and/or a cationic charge on the external surface of the lens. As a result, the methacrylate lenses are still subject to fogging by mucus present in the lacrimal fluids and to partial hydration by such fluids. Also, the bare methacrylate surface may cause slight irritation to the eye when it is inserted. Further, these lenses have exhibited a tendency to dry on the outer surface away from the cornea inbetween applications of lacrimal fluid by the eye lids during blinking. This drying causes an interference with the vision and additional irritation to the eye. Of equal importance is the problem of warpage by which a corneal lens is distorted by various factors such as drying and pressure, thereby changing the basic optical properties of the lens itself. These problems must be solved before a completely comfortable lens is produced.

Therefore, in order to render a lens compatible with the eye, it is necessary to provide all of its surfaces with a coating which will act as a buffer between the eye and the lens and which will substantially hydrate the lens to reduce its tendency to dry or adsorb the mucus present in the eye fluids.

The coating (wetting) and hydration (soaking) of contact lenses has generally been approached by the optical profession as one of mere wetting the external surface and controlling the dehydration of the lens.

Thus optometrists have suggested the use of water or water containing cationic germicidal agents such as benzalkonium chloride and chlorobutanol as sufficient for control of lens dehydration. Others have suggested that extremely small quantities, e.g., .003%, of methyl cellulose or carboxyl methyl cellulose may be used as mechanical buffers between the lens and the eye, the percentage chosen being such that substantial equilibrium is maintained between the number of particles in the solution and the physiological phase of the eye itself until the tears have formed sufficiently to wet the lens surface. However, none of these compositions has been found totally satisfactory for methyl methacrylate hydration because of the extreme hydrophobicity of the polymer.

The present invention is intended and adapted to overcome the difficulties and disadvantages inherent in the compositions of the type described, it being among the objects of the present invention to provide a lens treating solution which substantially hydrates the entire lens structure with an isotonic solution before it is inserted into the eye.

It is also among the objects of this invention to provide a composition which is compatible with the natural fluids of the eye, being substantially isotonic, and which minimizes any irirtation to the eye both when the lens is inserted and while it is worn.

It is further among the objects of the present invention to provide a composition for treatment of contact lenses which has increased biocidal effects.

It is still further among the objects of the present invention to provide a contact lens treating solution which reduces any possibility of blurring while the lens is in the eye and suppresses warpage of the lens whether in the eye or in a storage container.

It is still a further object of the present invention to provide a contact lens treating solution which fully wets the outer surface of the lens and which suppresses dehydration while the lens is in the eye.

Additional objects will become apparent from a consideration of the following description and claims.

Briefly, the composition of the instant invention comprises a relatively high percentage of cellulosic compound selected from the group consisting of methyl cellulose and hydroxy ethyl cellulose as a mechanical buffering agent and a hydrating agent consisting essentially of a salt and both acid and basic buffers for controlling said hydrating agent. When necessary, as with hydroxy ethyl cellulose, a non-ionic surfactant such as a polyoxyalkylene derivative or sorbitan monooleate (Tween 80, manufactured by the Atlas Powder Company) is included in the composition to increase the wetting ability. The non-ionic surfactant must have an H.L.B. of more than 10 in order to be fully soluble in the aqueous phase (H.L.B.=hydrophile lipophile balance—see Remington Practice of Pharmacy—Martin and Cook, 1961, pp. 224, 225, Mack Pub. Co., Easton, Pa.). Further, the surfactant must be compatible with all of the other ingredients and must maintain its stability during both temperature and pH changes. As stated above, Tween 80 is preferred, but other surfactants such as members of the "Span" series or other "Tweens" may be used either alone or in combination. The composition may also and desirably include certain specific biocidal agents.

Span is the trademark by the Atlas Powder Company for a series of non-ionic surface active agents possessing emulsifying, dispersing, and wetting properties. They are long chain fatty acid partial esters of hexatol anhydrides including sorbitan, sorbides, mannitans and mannides.

Tween is the registered trademark of the Atlas Powder Company for a series of non-ionic surface active agents possessing emulsifying, detergent and wetting properties. They are polyoxyalkylene derivatives of hexatol anhydride partial long chain fatty acid esters.

Any of the compositions falling under these trade names may be utilized with the above compositions provided they meet the H.L.B. requirements noted above.

This composition as a whole produces a unique lens hydrating (soaking) and wetting solution which permeates the very structure of the polymer and in which each ingredient coacts with the others to produce the desired effects which are more than the mere additive effects of the individual ingredients.

In the above composition the methyl cellulose or hydroxy ethyl cellulose-surfactant combination is required for a two-fold purpose: First, they act as a mechanical buffering agent between the contact lens and the eye and, second, they appear to reduce the surface tension of the water so that a thin coating of the composition will completely cover the contact lens. The former effect is caused by the characteristics of both methyl cellulose and hydroxy ethyl cellulose which increases the viscosity of the solution. This results in the placing of an elastic coating between the lens and the eye so that any contact between the eye and the lens will be through a relatively elastic and thus, non-irritating medium. The latter effect, reduction of surface tension, in the case of methyl cellulose is probably the result of this compound's unique effect on water particles wherein a very small quantity of the methyl cellulose will break down the water molecules and hold them in a state of partial separation. This allows the molecules to flow easily over the surface of the lens and cover it completely. In the case of the hydroxy ethyl cellulose-surfactant combination, the surfactant provides the action to reduce the surface tension. These effects are produced by an amount of methyl cellulose of from .3% to .6%. Less than .3% will result in a composition having insufficient wetting characteristics while an amount greater than .6% materially increases the viscosity and renders the composition sticky, an undesirable property since the composition will be irritating to the eye and will tend to hold any foreign matter with which it comes in contact. Where hydroxy ethyl cellulose is used in combination with the surfactant the former should be present in the range of about .5% to 1.3% for good stability at high temperature and proper viscosity, while the latter is necessary in the range of about .01% to .15% in order to obtain proper surface coverage.

It is preferred that the hydroxy ethyl cellulose be present in the range of .75% to .9% for optimum viscosity while the preferred amount of surfactant is in the range of .08% to .10% for ideal surface coverage. The necessity of these ranges will be further pointed out below in the following discussion of the hydrating agents.

It is known that methyl methacrylate polymers, though hydrophobic, may be slightly hydrated with water. However, water, even with wetting agents, fails to adequately hydrate such a lens for eye compatibility.

It has been discovered that a high degree of hydration of methyl methacrylate lenses may be carried out by taking advantage of a unique property of the polymer, i.e. the presence of minute quantities of moisture in the polymer structure. Recognizing this, a hydrating agent is utilized which possibly through the use of two well recognized phenomena of physical chemistry, dialysis and/or osmosis, substantially hydrates the lens.

The hydrating agents preferred are a combination of salt plus both acidic and basic buffers therefor. Specifically, it has been discovered that a salt such as sodium chloride which is highly ionizable, when combined with both basic and acidic buffers such as disodium and monosodium phosphates, respectively, may be used. The general action of these ingredients, which must be compatible with the mechanical buffer discussed above, may be characterized as follows although this is theoretical and I do not wish to be bound by my proposed theory of operation:

The sodium chloride when placed in water solution readily ionizes to produce sodium cations and chloride anions. This solution when applied to the contact lens is, of course, in direct contact with the hydrophobic outer surface of the lens polymer. The surface of the methacrylate polymer, however, may be considered to be in in the form of a semi-permeable membrane, and the moisture present in the plastic is located behind this structure.

The salt solution when applied ot this surface appears to produce an immediate dialysis effect between the moisture in the polymer and the solution of the surface, whereby the sodium chloride electrolyte attempts a passage through the semi-permeable membrane of polymer to bring the moisture in the polymer to equilibrium with the contact solution. It is assumed, however, in view of an apparent cationic charge on the surface of the polymer, more of the chloride ions will pass through the semi-permeable memberane than sodium ions. This could result in a pH variance of the contact solution due to the sodium ion excess. However, the pH variation is controlled by the acidic and basic buffers, the amounts of which are so adjusted that the particle concentration of the solution remains constant. Upon substantial dialysis the particle concentration of the moisture in the polymer will be greater than that of the contact solution and the dialysis will cease. When this has occurred it is assumed that the next phenomena will come into effect, i.e. osmosis. Since the particle concentration in the lens, because of the minute quantities of moisture, will be greater than the particle concentration of the solution outside the lens, the latter will now pass by osmosis to place more water in the lens while attempting to bring the outer and inner concentrations to equilibrium. This action brings in the water necessary for complete hydration.

The action as proposed above has been somewhat simplified to show the general concept of the invention. In actuality it may be assumed that both the chloride and phosphate ions released by the buffering agents enter into the reaction and increase its rate while maintaining a constant pH.

It has been discoverd that sodium chloride in the range of about .4% to .5% is necessary for these phenomena while maintaing a solution which is compatible with the intracellular eye fluids. Greater percentages will produce an irritating effect, while lesser amounts do not provide sufficient ions for the action desired. In place of sodium chloride, other alkali metal halides such as sodium bromide, potassium chloride, or potassium bormide may be used.

The buffers are required to maintain a constant pH minimum in the range of 6.6 to a maximum 7.8, preferably 7.0 to 7.8, during the hydration so that the solution will be substantially compatible with the eye fluid while maintaining an excess of anions for the hydration. It is preferred to utilize anhydrous disodium phosphate as the basic buffer in amounts of from .5 to .9% and monosodium phosphate as the acid buffer in amounts of from .4% to .08%. These latter quantities are necessary for full buffering action while maintaining the solution non-irritating. Other buffers may be utilized such as monopotassium and dipotassium phosphates when potassium salts are those ionized.

The above ranges are critical although variations will be made in these ranges dependent upon the specific amounts of salt utilized and the pH desired. However, these variations must result in a hydrating solution which permeates the entire lens structure with a composition that is itself substantially isotonic.

As pointed out above, the methyl cellulose of hydroxy ethyl cellulose-surfactant compositions are combined with these ingredients not only for their mechanical buffering properties, but also to increase the viscosity and surface wetting properties of the overall solution. This allows the salt and buffer solution to cover the entire surface of the lens and adhere thereto.

All of the above ingredients are placed in a water solution. The water is necessary solvent for the materials because of its generally non-reactive nature and the fact that it provides a source of readily available hydroxyl ions for the hydration.

The composition may also desirably contain a combination of compatible biocides. It was discovered that polysodium ethylenediamine tetraacetates and Thimerosal (sodium ethylmercurithiosalicylates) may be included in the composition without adversely affecting either the wetting or hydrating (soaking) properties. The Thimerosal may be present in amounts of from .001 to .008%, preferably .004%, while the polysodium ethylenediamine tetraacetates range may be from .05 to 1%, preferably .1% without affecting the overall physical properties of the compositions. Specific members of the polysodium ethylenediamine tetraacetates which may be used include both the di and tri as well as tetra-sodium compounds.

This combination of agents to combat pathogenic bacteria are extremely advantageous for the instant composition because of the following factors: They are only very slightly ionizable and thus will not affect the action of the buffers, they are extremely stable in the pH range 7.0–7.8, and they would not be absorbed into the lens because of their respectively large particle size.

Combining the above ingredients, the following composition utilizing methyl cellulose comes within the scope of the present invention.

| Ingredient: | Percent by weight |
|---|---|
| Alkali metal halide | 0.4–0.5 |
| Mono alkali metal acid phosphate | .08–.4 |
| Dibasic alkali metal acid phosphate | .5–.9 |
| Methyl cellulose | .3–.6 |
| Ethylenediamine tetraacetate (Polysodium) | 0–1.0 |
| Thimerosal | 0–.008 |
| Water | Remainder |

With hydroxy ethyl cellulose and non-ionic surfactant the following composition is encompassed by the present invention.

| Ingredient: | Percent by weight |
|---|---|
| Alkali metal halides | 0.4–0.5 |
| Mono alkali metal acid phosphate | .08–.4 |
| Dibasic alkali metal acid phosphate | .5–.9 |
| Hydroxy ethyl cellulose | .5–1.3 |
| Surfactant | .01–.15 |
| Ethylenediamine tetraacetate (Polysodium) | 0–1.0 |
| Thimerosal | 0–.008 |
| Water | Remainder |

Specific examples of compositions made and tested under the above are as follows.

*Example I*

| Ingredient: | Weight percent |
|---|---|
| NaCl | .460 |
| NaH$_2$PO$_4$ | .320 |
| Na$_2$HPO$_4$ | .568 |
| Methyl cellulose | .400 |
| Disodium EDTA | .100 |
| Thimerosal | .004 |
| Water | 98.148 |

The mixture was produced by combining the methyl cellulose with water heated to 200° F. The mixture was stirred for 20 minutes and refrigerated to 37° F. After the methyl cellulose was in solution the remaining materials were added and the entire solution was stirred for 2 hours. The resulting composition has a pH of 7.0 and effectively hydrated contact lenses. These lenses were worn without discomfort or fogging for up to 18 hours. Tests indicated very low warpage, the results of studies using the above composition showing a base curve change of .024 mm. which is the mean error of reading on a Keratometer.

*Example II*

| Ingredient: | Weight percent |
|---|---|
| NaCl | .450 |
| NaH$_2$PO$_4$ | .240 |
| Na$_2$HPO$_4$ | .668 |
| Methyl cellulose | .500 |
| Tetrasodium EDTA | .200 |
| Thimerosal | .600 |
| Water | 97.941 |

The composition when blended as in Example I had a stable pH of 7.2 and excellent hydrating characteristics without irritation to the eye.

*Example III*

| Ingredient: | Weight percent |
|---|---|
| NaCl | .440 |
| NaH$_2$PO$_4$ | .160 |
| Na$_2$HPO$_4$ | .758 |
| Methyl cellulose | .450 |
| Disodium EDTA | .250 |
| Thimerosal | .003 |
| Water | 97.939 |

The same method was used for blending as in Example I. The composition's pH was 7.4.

*Example IV*

| Ingredient: | Weight percent |
|---|---|
| NaCl | .450 |
| NaH$_2$PO$_4$ | .160 |
| Na$_2$HPO$_4$ | .850 |
| Hydroxy ethyl cellulose | .900 |
| Tween 80 | .085 |
| Disodium EDTA | .100 |
| Thimerosal | .004 |
| Water | 97.641 |

The composition was prepared by first adding all of the salts and buffers along with the surfactant to the water in an external steam-heated pressure reactor. Stirring was maintained until all of the salts were dissolved at which time the hydroxy ethyl cellulose was added with additional stirring and heat application. Stirring was continued until full solution of the hydroxy ethyl cellulose and the temperature was at 250° F. with the pressure at 15 p.s.i.g. After 15 minutes the heating was discontinued and the solution cooled to room conditions. Under sterile conditions the Thimerosal was added with additional stirring until complete solution.

The resultant compositions had a pH of 7.4 and produced excellent wetting and soaking of lenses under all conditions of normal use. It was extremely stable at temperatures up to 250° F.

*Example V*

| Ingredient: | Weight percent |
|---|---|
| NaCl | .460 |
| NaH$_2$PO$_4$ | .320 |
| Na$_2$HPO$_4$ | .568 |
| Hydroxy ethyl cellulose | .950 |
| Tween 80 | .090 |
| Disodium EDTA | .100 |
| Thimerosal | .004 |
| Water | 97.508 |

The above composition was blended in the same manner as Example IV and exhibited similar properties of wetting and soaking of the contact lenses after extended periods of time. The pH was 7.0.

*Example VI*

| Ingredient: | Weight percent |
|---|---|
| Sodium Chloride | .450 |
| NaH$_2$PO | .240 |
| Na$_2$HPO$_4$ | .663 |
| Hydroxy ethyl cellulose | .850 |
| Tween 80 | .080 |
| Tetrasodium EDTA | .200 |
| Thimerosal | .006 |
| Water | 97.506 |

The composition, blended in a similar manner to Example IV, had a stable pH of 7.2 and excellent hydrating characteristics without irritation to the eye even after prolonged usage.

The composition of the instant invention may be prepared by any suitable means. The salt solution may be prepared first and the methyl cellulose or hydroxy ethyl cellulose and surfactant added afterwards or vice-versa. It is preferred to add the biocidal agents after the buffered salt-cellulosic material blend has been prepared.

As pointed out above, I have invented a new and useful composition for treatment of contact lens wherein a cellulosic material is utilized as a basic ingredient. It is further to be noted that both other cellulosic materials and other materials have been considered, but were found to have deleterious effects on the overall composition. For example, polyvinyl alcohol and polyvinyl pyrrolidone were incorporated in the composition without methyl cellulose or hydroxy ethyl cellulose, but the solution did not exhibit the proper degree of eye compatibility. Similar effects were obtained when hydroxy propyl methyl cellulose (Methocel H.G., Dow Chemical Company) and carboxy methyl cellulose were used. Further, it was discovered that these compounds even when combined with surfactants failed to elicit the high degree of eye compatibility needed for contact lens treatment.

The basic composition of the instant invention, however, may include these latter mentioned compounds provided the methyl cellulose or hydroxy ethyl cellulose-surfactant composition is present.

The contact lens treating solution of the instant invention may be used with any of the standard non-scleral or corneal lens storage container. This container usually consists of a double-ended container with a screw thread top on either end and a partition in the middle. The diameter is slightly greater than the width of the lens. When the hydration and wetting is desired, the lens is placed in the container to which the composition of the instant invention has already been added. Satisfactory hydration will initially take about 4 to 72 hours while the lens can be left in the solution for many weeks without deleterious effect. After initial hydration placing in the solution for 2 hours will re-establish maximum hydration. When the lens is to be placed in the eye it is removed by the finger tips from the container and placed with or without intermediate water rinsing in the eye. The lens will immediately clear and will remain in the eye without irritation for considerable periods of time.

As many widely different embodiments of this invention may be made without departing from the spirit and scope thereof, it is to be understood that the invention is not limited to the specific embodiments thereof except as defined in the appended claims.

What is claimed is:

1. A composition for hydrating and wetting contact lenses consisting essentially of: (1) a phosphate buffered eye compatible alkali metal halide salt water solution; and, (2) a member selected from the group consisting of .3 to .6% methyl cellulose and a combination of about .5 to 1.3% hydroxy ethyl cellulose with about .01 to .15% non-ionic surfactant, said composition having a pH of from 6.6 to 7.8.

2. A composition for hydrating and wetting contact lenses consisting essentially of about .4 to .5% eye compatible alkali metal halide salt, about .08 to .4% eye compatible monobasic alkali metal phosphate and about .5 to .9% eye compatible dibasic alkali metal phosphate as chemical buffers, water, and a member selected from the group consisting of .3 to .6% methyl cellulose and a composition consisting of about .5 to 1.3% hydroxy ethyl cellulose with about .01 to .15% non-ionic surfactant as a mechanical buffer and a wetting agent, said hydrating and wetting composition having a pH in the range of 6.6 to 7.8.

3. A composition according to claim 2 wherein the alkali metal halide salt is sodium chloride and the chemical buffers are sodium phosphates.

4. A composition according to claim 2 wherein the alkali metal halide salt is potassium chloride and the chemical buffers are potassium phosphates.

5. A composition according to claim 7 wherein the non-ionic surfactant is a polyoxyalkylene derivative of hexatol anhydride partial long chain fatty acid ester.

6. The composition of claim 2 wherein the pH is in the range of 7.0 to 7.8.

7. A composition for hydrating and wetting contact lenses consisting essentially of: (1) a phosphate buffered eye compatible alkali metal halide salt water solution; and, (2) a combination of about .5 to 1.3% hydroxy ethyl cellulose with about .01 to .15% nonionic surfactant as a mechanical buffer and wetting agent, said composition having a pH of from 6.6 to 7.8.

8. A composition for hydrating and wetting contact lenses consisting essentially of about .4 to .5% eye compatible alkali metal halide salt, about .08 to .4% eye compatible monobasic alkali metal phosphate and about .5 to .9% eye compatible dibasic alkali metal phosphate as chemical buffers, water, and a composition consisting of about .5 to 1.3% hydroxy ethyl cellulose with about .01 to .15% nonionic surfactant as a mechanical buffer and wetting agent, said hydrating and wetting composition having a pH in the range of 6.6 to 7.8.

9. A composition according to claim 8 wherein the alkali metal halide salt is sodium chloride and the chemical buffers are sodium phosphates.

10. A composition according to claim 8 wherein the alkali metal halide salt is potassium chloride and the chemical buffers are potassium phosphates.

11. A composition according to claim 8 wherein the pH is in the range of 7.0 to 7.8.

12. The composition according to claim 2 which includes .05 to 1% polysodium ethylenediamine tetraacetate in combination with .001 to .008% sodium ethylmercurithiosalicylate as biocides.

13. The composition according to claim 7 which includes .05 to 1% polysodium ethylenediamine tetraacetate in combination with .001 to .008% sodium ethylmercurithiosalicylate as biocides.

14. A composition for hydrating and wetting contact lenses consisting essentially of about .4 to .5% eye compatible alkali metal halide salt, about .08 to .4% eye compatible monobasic alkali metal phosphate and about .5 to .9% eye compatible dibasic alkali metal phosphate as chemical buffers, water, and from .3 to .6% methyl cellulose as a mechanical buffer and wetting agent, said hydrating and wetting composition having a pH in the range of 6.6 to 7.8.

15. A composition according to claim 14 wherein the alkali metal halide salt is sodium chloride and the chemical buffers are sodium phosphate.

References Cited by the Examiner

UNITED STATES PATENTS

| 2,012,820 | 8/35 | Kharasch | 23—250 |
| 2,561,010 | 7/51 | Carson | 106—13 |
| 2,689,184 | 9/54 | Grossi | 106—194 |
| 2,864,844 | 12/58 | Davisson | 260—433 |

OTHER REFERENCES

Drug and Cosmetic Industry, vol. 61, July 1947, page 101, Library code RS 1 D7, copy in P.O. Library.

Jour. of American Pharmaceutical Assoc., Practical Pharmacy Edition, vol. 11, No. 12, December 1950, pages 734–736, RS 1 A517, copy in P. O. Library.

ALEXANDER H. BRODMERKEL, *Primary Examiner.*

MORRIS LIEBMAN, *Examiner.*